Jan. 27, 1970   A. G. HUFSTEDLER   3,492,636
WIRE LINE COMMUNICATION AND SHOOTING CONTROL SYSTEM
Filed Dec. 29, 1967
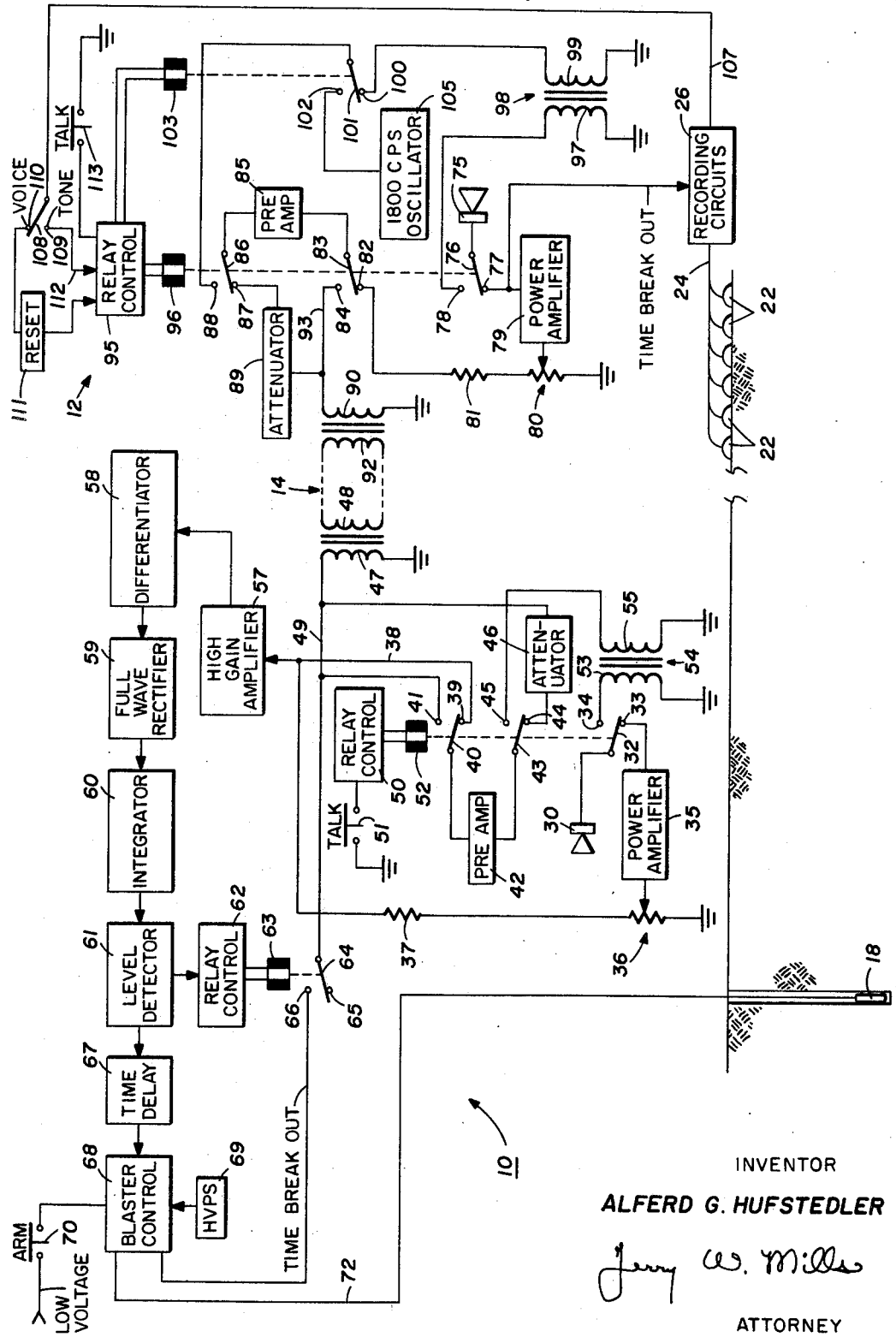
INVENTOR
ALFERD G. HUFSTEDLER
*Jerry W. Mills*
ATTORNEY United States Patent Office 3,492,636
Patented Jan. 27, 1970

3,492,636
WIRE LINE COMMUNICATION AND SHOOTING CONTROL SYSTEM
Alferd G. Hufstedler, Dallas, Tex., assignor to Texas Instruments Incorporated, Dallas, Tex., a corporation of Delaware
Filed Dec. 29, 1967, Ser. No. 694,490
Int. Cl. G01v 1/00
U.S. Cl. 340—15.5   3 Claims

ABSTRACT OF THE DISCLOSURE

Voice communication circuitry positioned at a seismic exploration shooting station and at a seismic data recording station is connected with a wire line signal channel. Circuitry is provided at the recording station to selectively discontinue voice communication with the shooting station and to transmit a control signal over the wire line to the shooting station. The control signal is sensed at the shooting and utilized, after a predetermined time delay, to initiate the detonation of a seismic impulse. A relay closes in response to the control signal in order to impress the impulse time break on the wire line for transmission to the recording station. The impulse time break initiates the recordation of reflections from the seismic impulse.

---

This invention relates to seismic exploration, and more particularly to the use of a wire line system to provide communications and shot sequencing control between a shooting station and a recording station.

In seismic exploration wherein a dynamite charge is detonated to generate seismic waves which are received by geophones and recorded, it is necessary to provide an accurate indication of the instant of detonation to the recording site in order to precisely time the recorded waves. It is also desirable to have voice communications between the shooting and the recording stations in order to facilitate the conduction of the exploration.

Many systems have heretofore utilized wire lines between the shooting station and the recording station and have supplied power down the wire line in order to actuate relays and detonate the seismic wave source. While the utilization of wire lines between the shooting and recording stations is advantageous due to the simplicity of circiutry required, such systems have not heretofore been generally acceptable for several reasons.

Relatively heavy, hard to handle, special multi-conductor cables are usually required in such systems, as the seismometer cables generally available at the exploration site are constructed from small gauge wire not capable of carrying sufficient power to operate relays. These multi-conductor cables carry relatively high level signals and are usually positioned in close proximity to the lines carrying very low level signals from geophones to high gain amplifiers at the recording station. The high level signals from the multi-conductor cables often cause cross-coupling problems in the geophone lines, causing distortion of the geophone outputs and some overloading of the high gain amplifiers.

As a result of these and other problems in direct wire connection systems, the seismic exploratioin industry has generally turned to the use of wireless systems wherein communications and shot sequencing control is provided between a shooting station and a recording station by radio waves. Such systems are described in U.S. Patent 3,220,503, issued Nov. 30, 1965, and U.S. Patent 3,225,858, issued Dec. 28, 1965. Such wireless systems must inherently be much more complex and expensive than direct connection systems, and do not provide the ease of operation provided by direct wire line connection for shooting operations in relatively close proximity to the seismometer cable.

In accordance with the present invention, voice communication and shot sequencing is provided between a recording and a shooting station with the use of a two wire signal channel, which may comprise extra wires in a seismometer cable, without problems in cross-coupling into the seismometer circuitry. Voice communication circuits are located at each of the stations and circuitry is provided to selectively couple the communication circuits to the wire line to provide two-way voice communication between the stations. Circuitry is also provided at the recording station for disconnecting the voice communication circuitry and transmitting a control signal over the wire line to control the detonation of the seismic wave source. Means responsive to the control signal at the shooting station provides an indication of the instant of source detonation to the wire line for control of recorders at the recording station.

For a more complete understanding of the present invention and for further objects and advantages thereof, reference may now be had to the following description taken in conjunction with the accompanying drawings, in which the figure illustrates a block diagram of a preferred embodiment of the invention.

The drawing illustrates a seismic exploration system wherein a shooting station 10 is connected to a recording station 12 by a wire line 14. Two-way voice communication is provided between the shooting and the recording stations via the wire line 14. In addition, control signals transmitted from the recording station 12 over the wire line 14 alert an operator at the shooting station 10 to arm a dynamite charge 18. A predetermined time after the termination of the control signals, the dynamite charge 18 is detonated to impart seismic waves into the earth. Reflections from the seismic waves are received by geophones 22 which are connected by suitable seismometer cables 24 to the recording circiuts 26.

Indication of the time breaks of the dynamite charge 18 are transmitted from the shooting station 10 via the wire line 14 to the recording circuits 26. The wire line 14 may comprise any suitable two-wire cable, but preferably is a wire pair from the seismometer cables 24. As will be later described provision is made to prevent cross-coupling of the high level voice communication signals between the two stations into the seismometer cables 24 which lead to the recording circiuts 26.

The voice communication circuitry at the shooting station 10 includes a combination microphone and speaker 30 connected to a relay switch arm 32 movable between contacts 33 and 34. Switch arm 32 is normally closed on contact 33 for connection with the output of a power amplifier 35. The input of power amplifier 35 is connected through a volume control variable resistor 36 and a resistance 37 to a lead 38 which terminates in a relay switch contact 39. A relay switch arm 40 is normally closed on contact 39, but may be actuated to close on a switch contact 41.

A preamplifier 42 is connected between the relay switch arm 40 and a relay switch arm 43 which is movable between switch contacts 44 and 45. Relay switch arm 43 is normally closed on contact 44 to connect preamplifier 42 with an attenuator 46. The input of the attenuator 46 is connected to a winding 47 of an isolation transformer. The wire pair 14 is connected across the winding 48 of the isolation transformer. The winding 47 is also connected to the switch contact 41 by the lead 49.

A relay control 50 may be actuated by the manual depression of a button switch 51 to energize the relay coil 52 which switches each of the relay switch arms 32, 40, and 43.

With the relay coil 52 in the energized state, the microphone 30 is connected through the switch arm 32 and the contact 34 to the grounded primary winding 53 of an impedance matching transformer 54. The grounded secondary winding 55 of the transformer 54 is connected to the switch contact 45, thereby connecting the speaker 30 through the preamplifier 42 and to the transformer winding 47 when the relay coil 52 is energized.

The input of a high gain amplifier 57 is connected to the lead 38, and the output of the amplifier 57 is coupled to a differentiator 58. A full wave rectifier 59 is connected between the differentiator 58 and an integrator 60. The output of the integrator 60 is fed into a level detector 61 which operates a relay control 62. A relay coil 63 controls the position of a relay switch arm 64 between a pair of switch contacts 65 and 66.

An output from the level detector 61 is also fed into a time delay circuit 67 which is connected to a blaster control circuit 68. A high voltage power supply 69 supplies cap power to the blaster control circuit 68. When a switch 70 is manually depressed, a source of low voltage is applied to arm the blaster control 68. After the blaster control 68 is armed, a trigger signal from the time delay circuit 67 actuates circuitry in the blaster control to supply current through the lead 72 to detonate the dynamite charge 18.

The circuitry at the recording station 12 includes a combination microphone and speaker 75 which is connected to a relay switch arm 76 movable between a pair of switch contacts 77 and 78. In the normal position of the switch arm 76, the output of a power amplifier 79 is connected to the speaker 75. The input of the power amplifier 79 is connected through a volume control variable resistance 80 and a resistor 81 to a switch contact 82. A relay switch arm 83 is movable between contact 82 and a contact 84. Switch arm 83 is connected to a preamplifier 85.

The input of the preamplifier 85 is connected to a relay switch arm 86 movable between switch contacts 87 and 88. Contact 87 is connected to an attenuator 89 which is in turn connected to a winding 90 of an isolation transformer. The other winding 92 of the isolation transformer is connected across the wire pair 14. Winding 90 is directly connected to contact 84 via a lead 93.

A relay control circuit 95 controls the energization of a relay coil 96. When the relay coil 96 is energized, the relay switch arms 76, 83 and 86 are respectively switched from the illustrated positions to close on contacts 78, 84 and 88. When the relay switch arm 76 is closed on switch contact 78, the microphone 75 is connected to the primary winding 97 of a matching transformer 98. The secondary winding 99 of the transformer 98 is connected between ground and a switch contact 100.

A relay switch arm 101 is movable between contact 100 and a contact 102 by a relay coil 103 also operated by the relay control circuit 95. Relay switch arm 101 is normally closed on contact 100. When the relay coil 103 is energized, relay switch arm 101 closes on contact 102 to connect an 1800 cycles per second oscillator 105 into the circuitry. The relay control circuit 95 is controlled in accordance with outputs from the recording circuits 26 via lead 107. A switch arm 108 is connected to lead 107 and is movable between a tone contact 109 and a voice contact 110. A reset circuit 111 is connected between contact 110 and the relay control 95. Lead 112 connects contact 109 and relay control 95. Additional control of the relay control circuit 95 is afforded by manual depression of a button switch 113.

Briefly, the present invention has a number of operational modes. In the drawing, the systems at both the shooting station 10 and the recording station 12 are in a Listen Mode. The button switch 51 at the shooting station 10 may be depressed manually to place the circuitry at the shooting station 10 in a Talk Mode. Personnel at the shooting station 10 may then transmit voice signals over the wire line 14 which are broadcast at the recording station 12 via the speaker 75. Alternatively, the circuitry at the recording station 12 may be placed in a Talk Mode by the manual depression of the button switch 113. Voice signals may then be transmitted over the wire line 14 and the broadcast to the personnel at the shooting station 10 from the speaker 30.

For the initiation of a Shooting Cycle, personnel at the recording station 12 close the switch arm 108 on tone contact 109 to operate the relay control 95 to connect the oscillator 105 to the wire line 14. The personnel at the shooting station 10 hear the 1800 cycles per second shoot tone from the speaker 30, and depress the switch 70 to arm the blaster control circuit 68. After a short interval, the transmission of the 1800 cycles per second tone is terminated and the circuitry at the recording station 12 is reset to the Listen Mode.

Upon termination of the shoot tone, circuitry at the shooting station 10 closes the relay switch arm 64 with contact 66 so that a time break of the shot detonation will be transmitted via the wire line 14 to the recording circuits 26. After a predetermined time delay, which enables the amplifiers of the system to recover from any high level voice communication signals, a trigger signal is provided to the blaster control 68 and the shot 18 is detonated. Reflections from the generated seismic waves are received by the geophones 22 and are recorded by the recording circuits 26 which are started by the time break signal.

A more specific description of the operation of the system will now be provided. In the illustrated configuration, both the shooting station 10 and the recording station 12 are connected in Listen Modes. To place the circuitry at shooting station 10 in a Talk Mode, the button switch 51 is depressed and the relay control 50 energizes the relay coil 52. Each of the relay switch arms 32, 43, and 40 are switched. The microphone 30 is then connected through the relay switch arm 32 to the primary winding 53 of the transformer 54. Voice signals pass through the secondary winding 55, the contact 45 and the relay switch arm 43 to the input of the preamplifier 420. The amplified signals are then fed through the relay switch arm 40, contact 41 and lead 49 to the winding 47 of the isolation transformer, wherein the signals are impressed upon the wire line 4.

With the recording station 12 in the Listen Mode, the switch arm 108 is closed on voice contact 110. The voice communication signals are passed to the winding 90 of the isolation transformer to the attenuator 89 which controls the sensitivity of the system. The signals are then passed through the relay switch arm 86 to the input of the preamplifier 85. The amplified signals are then fed through the relay switch arm 83, the contact 82, the resistor 81 and the variable resistor 80. The variable resistor 80 is adjusted in accordance with the desired volume control. The signals are then fed into the power amplifier 79 and broadcast from the speaker 75 to the personnel at the recording station 12.

Alternatively, when the button switch 108 is pressed at the recording sttion 12, the relay control 95 energizes the relay coil 96 to switch each of the relay switch arms 76, 83 and 86. In this Talk Mode of operation, the microphone 75 is connected through the switch arm 76 and the contact 78 to the matching transformer 98. The audio signals are fed from the transformer 98 through the relay switch arm 101, the switch contact 88 and through the relay switch arm 86 to the input of the preamplifier 85. The amplified signals are then fed through the relay switch arm 83 and the lead 93 to the winding 90 of the isolation transformer, wherein the signals are impressed upon the wire pair 14 for transmissions to the shooting station 10.

At the shooting station 10, the audio signals are passed through the winding 47 of the isolation transformer to the attenuator 46 which determines the sensitivity of the receiving circuitry. The output from the attenuator 46 is fed through the contact 44 and the switch arm to the input of the preamplifier 42. The amplified signals are fed through the relay switch arm 40, contact 40, lead 38, resistor 37 and the volume control resistor 36. Signals are then passed to the power amplifier 35 and through the relay switch arm 32 for broadcast from the speaker 30.

When it is desired to initiate a Shooting Cycle, the circuitry at the shooting station 10 is placed in the Listen Mode, and the switch arm 108 at the recording station 12 is closed on the tone contact 109. The relay coils 96 and 103 are energized by relay control 95 to place the circuit in a Shoot Mode. The speaker 75 is thus disconnected from the circuit and the 1800 cycles per second oscillator 105 is connected into the circuit through the contact 102 and the relay switch arm 101.

The 1800 cycles per second shoot tone is then transmitted through the contact 88 and the relay switch arm 86 to the input of the preamplifier 85. The amplified shoot tone is then fed through the relay switch arm 83, the contact 84 and the lead 93 to the winding 90 of the isolation transformer, where the tone is impressed upon the wire line 14 for transmission to the shooting staton 10. The shooting station 10 is in Listen Mode, and therefore the 1800 cycles per second shoot tone passes through the winding 47 of the isolation transformer to the attenuator 46. The tone is then amplified by the preamplifier 42 and passes through the lead 38 to the input of the high gain amplifier 57.

Additionally, the 1800 cycles per second shoot tone passes through the resistor 37, the variable resistor 36 and the power amplifier 35 to the speaker 30 for broadcast to the shooting station personnel. Upon hearing this 1800 cycles per second shoot tone, the personnel at the shooting station 10 depress the switch 70 to arm the blaster control 68.

The 1800 cycles per second shoot tone is amplified and squared by the amplifier 57 and fed to the differentiator 58. The differentiated output signal is rectified by the full wave rectifier 59 and fed into the integrator 60. The level detector 61 is switched to a level higher than its normal level as the voltage magnitude provided at the output of the integrator 60 increases.

Normally, the desired length of the 1800 cycles per second shoot tone from the oscillator 105 is approximately five seconds. Data acquistion equipment in the recording circuits 26 is then actuated to provide an indication via the connection 107 and lead 112 to the relay control 95. Control 95 then deenergies the relay coils 96 and 103 to return the circuit to a Listen Mode and to terminate the 1800 cycles per second tone.

Upon termination of the 1800 cycles per second shoot tone, the level detector 61 returns to its normal operating level due to the decrease of voltage at the output of the integrator 60. Detector 61 emits a signal to the relay control 62 in order to energize the relay coil 63 and closes the relay switch arm 64 on the contract 66. Additionally, a trigger signal is provided from the level detector 61 to the time delay 67. The delap provided by time delay 67 may be varied for different operating conditions, but normally will be in the range of one-half second in duration. This time delay allows the amplifiers of the circuitry to recover from any high level signals resulting from voice communication between the two stations. It will be noted that no voice communication is provided during the transmission of the low level shoot tone or during the receiving of reflected seismic waves, and thus no cross-coupling occurs on the seismometer cables 24.

After the expiration of the time delay, a trigger signal is provided to the blaster control 68 and power is provided via the line 72 to detonate the dynamite charge 18. Simultaneously, upon the detonation of the charge 18, a low level time break signal is transmitted from the blaster control 68 through the contact 66, the relay switch arm 64 through the contact 66, the relay switch arm 64 and the line 49 to the winding 47 of the isolaton transformer. The signal is then transmitted over the wire line 14 to the winding 90 at the recording station 12.

As the circuitry at the recording station 12 is in the Listen Mode, the low level time break signal is fed through the attenuator 89 and the relay switch arm 86 to the preamplifier 85. The amplified signal is then fed through the relay switch arm 83 and the resistors 81 and 80 to the input of the power amplifier 79. The amplified time break signal is then passed to the recording circuits 26 for recordation thereof. Additionally, this time break signal actuates circuitry in the recording circuits 26 to start the actual recording period of the direct reflections from the detonation.

After the reflections from the shot have been recorded and it is desired to initiate another shooting cycle, switch arm 108 is closed on voice contact 110 and the reset circuit 111 resets the system. When switch arm 108 is then closed on tone contact 109, the relay control 95 again energizes relay coils 96 and 103 to provide the 1800 cycles per second tone to the shooting station 10. The previously described procedure is then followed to again detonate a dynamite charge.

It will thus be seen that the invention allows the use of a wire line connection between two spaced stations to provide voice communications and accurate timing controls of events without presenting difficulties in the cross-coupling of high level communication signals and the like.

Whereas the present invention has been described with respect to a specific embodiment thereof, it is to be understood that various changes and modifications will be suggested to one skilled in the art, and such changes and modifications are to be encompassed by the appended claims.

What is claimed is:

1. A communications and timing system for connecting a seismic exploration shooting station and a seismic data recording station comprising:
   (a) a wire pair channel connecting said shooting station and said recording station,
   (b) voice intercommunication circuitry located at said shooting and said recording stations each including transducers for transmitting and receiving audio signals,
   (c) isolation transformers coupling said intercommunication circuitry to the ends of said wire pair channel,
   (d) first switches connected between said isolation transformers and each of said transducers and movable between two positions for selectively connecting said transducers to said wire pair channel through a first circuit path in one position and for connecting said transducers to said wire pair channel through a second circuit path in another position,
   (e) said first circuit path including a matching transformer and amplification circuitry for transmitting audio signals,
   (f) said second circuit path including a series connected amplifier and level controller for receiving audio signals,
   (g) oscillator means located at said recording station and including a second switch for selectively disconnecting said transducer from said wire pair channel and for transmitting a single frequency audible control signal from said oscillator means to said shooting station over said wire pair channel,
   (h) an integrator and level detector connected in series to said isolation transformer at said shooting station and responsive to said single frequency audible control signal for generating a shot trigger signal upon termination of said control signal,
   (i) means located at said shooting station for manual arming of a seismic disturbance generator by an operator upon occurrence of said audible control signal,
   (j) delay means connected to the output of said level detector and responsive to said shot trigger signal for actuating said seismic disturbance generator after a predetermined time delay to allow the system to recover from cross-coupling of high level signals from voice communication between said shooting and recording stations, and (k) a third switch operable by said single frequency audible control signal for connecting the time break signal from said seismic disturbance generator to said wire pair channel for transmission to said recording station.

2. The system of claim 1 and further comprising:
a differentiator and rectifier connected in series to the input of said integrator.

3. The system of claim 1 wherein reception of said time break signal initiates a recording period at said recording station.

References Cited

UNITED STATES PATENTS

| 2,369,082 | 2/1945 | Shook et al. | 340—15.5 X |
| 3,225,858 | 12/1965 | Pfab | 340—15.5 X |
| 3,220,503 | 11/1965 | Oakley | 340—15.5 |
| 3,316,996 | 5/1967 | Ball et al. | 181—0.5 |

RODNEY D. BENNETT, JR., Primary Examiner

D. C. KAUFMAN, Assistant Examiner